United States Patent
Morimoto

(10) Patent No.: US 12,492,297 B2
(45) Date of Patent: Dec. 9, 2025

(54) DEVULCANIZED RUBBER, RUBBER COMPOSITION, AND PNEUMATIC TIRE

(71) Applicant: Toyo Tire Corporation, Itami (JP)

(72) Inventor: Shouhei Morimoto, Itami (JP)

(73) Assignee: Toyo Tire Corporation, Itami (JP)

( * ) Notice: Subject to any disclaimer, the term of this patent is extended or adjusted under 35 U.S.C. 154(b) by 518 days.

(21) Appl. No.: 18/075,540

(22) Filed: Dec. 6, 2022

(65) Prior Publication Data

US 2023/0192990 A1 Jun. 22, 2023

(30) Foreign Application Priority Data

Dec. 22, 2021 (JP) ................................. 2021-207833

(51) Int. Cl.
*C08K 5/42* (2006.01)
*C08L 9/06* (2006.01)

(52) U.S. Cl.
CPC . *C08K 5/42* (2013.01); *C08L 9/06* (2013.01)

(58) Field of Classification Search
CPC ..................................... C08K 5/42; C08L 9/06
See application file for complete search history.

(56) References Cited

U.S. PATENT DOCUMENTS

| | | | |
|---|---|---|---|
| 4,211,676 A | 7/1980 | Watabe et al. | |
| 2016/0152805 A1* | 6/2016 | Jasiunas | B60C 1/0016 |
| | | | 523/156 |

FOREIGN PATENT DOCUMENTS

| | | |
|---|---|---|
| JP | S54-17985 A | 2/1979 |
| JP | 4633988 B2 | 2/2011 |
| WO | 01/23465 A1 | 4/2001 |

OTHER PUBLICATIONS

Sripornsawat et al. Influence of ground tire rubber devulcanization conditions on properties of its thermoplastic vulcanizate blends with copolyester European Polymer Journal 85 (2016) 279-297. (Year: 2016).*
Office Action dated Aug. 19, 2025, issued in counterpart JP Application No. 2021-207833, with English translation. (5 pages).

* cited by examiner

*Primary Examiner* — John E Uselding
(74) *Attorney, Agent, or Firm* — WHDA, LLP

(57) ABSTRACT

The present invention relates to a devulcanized rubber obtained by mixing a devulcanizing agent having an alkylsulfonamide group and a vulcanized rubber. The devulcanizing agent preferably contains a sulfonamide compound of an alkylamine having 12 or more carbon atoms. The present invention also relates to a rubber composition comprising the devulcanized rubber. The rubber composition preferably contains 1 to 30 parts by mass of the devulcanized rubber per 100 parts by mass of a total amount of an unvulcanized rubber component in the rubber composition.

5 Claims, No Drawings

DEVULCANIZED RUBBER, RUBBER COMPOSITION, AND PNEUMATIC TIRE

BACKGROUND OF THE INVENTION

Field of the Invention

The present invention relates to a devulcanized rubber and a rubber composition exhibiting good post-vulcanization physical properties and a pneumatic tire including a rubber part obtained by vulcanizing and molding the rubber composition.

Description of the Related Art

In recent years, there has been a strong demand for the reuse of vulcanized rubber waste materials generated from used tires and other rubber products due to an increase in environmental awareness.

Patent Document 1 mentioned below discloses a method for obtaining a re-vulcanizable devulcanization product, in which an amine compound is used as a devulcanizing agent, a rubber contains an EPDM polymer, a sulfur-cured rubber is heated during devulcanization to a temperature of 250 to 350° C., and devulcanization of the sulfur-cured rubber is carried out at a pressure of 5 to 10 MPa.

PRIOR ART DOCUMENT

Patent Document

Patent Document 1: JP-B2-4633938

SUMMARY OF THE INVENTION

As a result of intensive studies, the present inventors have found that when a devulcanization product obtained by the above conventional technique is added to a rubber composition, vulcanizing time or scorch time is significantly shortened, and therefore the rubber composition has room for improvement to further improve processability. In addition, it has also been found that the above conventional technique is dedicated to EPDM-based rubbers, and therefore there are limitations on the type of rubber constituting a vulcanized rubber used as a raw material of a devulcanized rubber.

The present invention has been accomplished by considering the circumstances as described above, and an object thereof is to provide a devulcanized rubber exhibiting good post-vulcanization physical properties, a rubber composition containing the devulcanized rubber and having excellent processability, and a pneumatic tire including a rubber part obtained by vulcanizing and molding the rubber composition.

The above problem can be solved by the following configuration. Specifically, the present invention relates to a devulcanized rubber obtained by mixing a devulcanizing agent having an alkylsulfonamide group and a vulcanized rubber.

In the devulcanized rubber, the devulcanizing agent is preferably a sulfonamide compound of an alkylamine having 12 or more carbon atoms.

Further, the present invention relates to a rubber composition containing the devulcanized rubber described above.

Furthermore, the present invention relates to a pneumatic tire including a rubber part obtained by vulcanizing and molding the rubber composition described above.

As described above, the conventional technique uses an amine compound as a devulcanizing agent. However, an amino group contained in an amine compound is strongly basic, and therefore a rubber composition containing a devulcanized rubber obtained by mixing a devulcanizing agent containing an amine compound and a vulcanized rubber tends to have a significantly short vulcanizing time or scorch time.

The devulcanized rubber according to the present invention is obtained by mixing a devulcanizing agent and a vulcanized rubber, and the devulcanizing agent is a compound having an alkylsulfonamide group. The density of a lone pair on the nitrogen atom of an alkylsulfonamide group is lower than that of an amino group. Therefore, the basicity of an alkylsulfonamide group is lower than that of an amino group. For this reason, a rubber composition containing a devulcanized rubber obtained by mixing a devulcanizing agent having an alkylsulfonamide group and a vulcanized rubber can have a sufficient vulcanizing time or scorch time and therefore has excellent processability. In addition, even when the devulcanized rubber is added to a rubber composition, an optimum vulcanizing time can be set, and therefore a vulcanized rubber of the rubber composition has excellent post-vulcanization physical properties. Therefore, the vulcanized rubber of the rubber composition can suitably be used for a rubber part of a pneumatic tire.

DETAILED DESCRIPTION OF THE PREFERRED EMBODIMENTS

A devulcanized rubber according to the present invention is obtained by mixing a devulcanizing agent having an alkylsulfonamide group and a vulcanized rubber.

As the vulcanized rubber used as a raw material of the devulcanized rubber according to the present invention, a vulcanized rubber of a diene-based rubber is preferably used. Examples of the diene-based rubber include, but are not limited to, natural rubber (NR), isoprene rubber (IR), butadiene rubber (BR), styrene-butadiene rubber (SBR), acrylonitrile-butadiene rubber (NBR), chloroprene rubber (CR), styrene-isoprene copolymer rubber, a butadiene-isoprene copolymer, and styrene-isoprene-butadiene copolymer rubber. These butadiene-based rubbers may be used alone or in combination of two or more thereof. The diene-based rubber is preferably natural rubber, butadiene rubber, styrene-butadiene rubber, or a blend of two or more thereof.

As the devulcanizing agent used as a raw material of the devulcanized rubber according to the present invention, a compound having an alkylsulfonamide group is used. Preferred is a compound obtained by sulfonamidation of a long-chain alkylamine compound, and more preferred is a compound obtained by sulfonamidation of an alkylamine compound having 12 or more carbon atoms. Examples of a preferred devulcanizing agent include a compound obtained by sulfonamidation of hexadecylamine (carbon number=16), a compound obtained by sulfonamidation of dodecylamine (carbon number=12), and a compound obtained by sulfonamidation of stearylamine (carbon number=18).

From the viewpoint of improving post-vulcanization physical properties, the devulcanized rubber according to the present invention is obtained by mixing a devulcanizing agent having an alkylsulfonamide group and a vulcanized rubber, wherein the amount of the devulcanizing agent used for treatment is preferably 1 to 30 parts by mass per 100 parts by mass of the total amount of the vulcanized rubber.

Sulfur used as a raw material of the vulcanized rubber may be any ordinary sulfur for rubber. Usable examples thereof include powdery sulfur, precipitated sulfur, insoluble sulfur, and highly dispensable sulfur.

An usable example of the vulcanized rubber used as a raw material of the devulcanized rubber is a vulcanized rubber obtained by vulcanizing a rubber composition obtained by appropriately blending, together with a rubber component and sulfur, a compounding agent usually used in the rubber industry, such as a vulcanization accelerator, carbon black, silica, a silane coupling agent, zinc oxide, stearic acid, a vulcanization retardant, an organic peroxide, an antiaging agent, a softener such as wax or oil, or a processing aid, as necessary.

As the carbon black, carbon black known to those skilled in the art can be used, and for example, SAF, ISAF, HAF, FEF, GPF, and the like are used. The content of the carbon black is preferably 30 to 100 parts by mass, more preferably 30 to 60 parts by mass per 100 parts by mass of the total amount, of the rubber component in the vulcanized rubber used as a raw material of the devulcanized rubber.

Examples of a vulcanization accelerator include vulcanization accelerators usually used for rubber vulcanization, such as a sulfonamides-based vulcanization accelerator, a thiuram-based vulcanization accelerator, a thiazole-based vulcanization accelerator, a thiourea-based vulcanization accelerator, a guanidine-based vulcanization accelerator, and a dithiocarbamate-based vulcanization accelerator, and these may be used alone or in appropriate combination thereof.

Examples of the antiaging agent include antiaging agents usually used for rubber, such as an aromatic amine-based antiaging agent, an amine-ketone-based antiaging agent, a monophenol-based antiaging agent, a bisphenol-based antiaging agent, a polyphenol-based antiaging agent, a dithiocarbamic acid salt-based antiaging agent, and a thiourea-based antiaging agent, and these may be used alone or in appropriate combination thereof.

The devulcanized rubber according to the present invention is preferably obtained by heating and mixing a vulcanized rubber and a devulcanizing agent with a shearing force being applied thereto, wherein the devulcanizing agent has an alkylamide group. Such a devulcanized rubber can be produced by, for example, heating and mixing a vulcanized rubber and a devulcanizing agent having an alkylamide group with a shearing force being applied thereto. An example of a method for applying a shearing force to the vulcanized rubber and the devulcanizing agent is a method in which the vulcanized rubber and the devulcanizing agent are heated and mixed while a shearing force is applied thereto using a rolling mill, a Banbury mixer, an extruder, a gear pump, an intermeshing-type mixer, a kneader, or a co-kneader generally used by those skilled in the art. In the present invention, when a shearing force is applied to the vulcanized rubber and the devulcanizing agent, a rolling mill, a Banbury mixer, an extruder, a gear pump, an intermeshing-type mixer, a kneader, and a co-kneader may be used alone or in combination thereof. When a rolling mill is used, an example of the method is a method in which the devulcanizing agent and the vulcanized rubber are passed through a rolling mill known to those skilled in the art so that the devulcanizing agent can cleave a sulfur cross-linked portion of the vulcanized rubber while the devulcanizing agent and the vulcanized rubber are mixed. When a Bunbary mixer is used, an example of the method is a method in which the devulcanizing agent and the vulcanized rubber are charged into a Bunbary mixer and stirred in the Bunbary mixer so that the devulcanizing agent can cleave a sulfur cross-linked portion of the vulcanized rubber. A shear pressure at the time when a shearing force is applied may be one applied to an object to be kneaded at the time when a roiling mill or a Bunbary mixer is used, and may be, for example, about 0.1 to 10 MPa.

The heating temperature at the time when the vulcanized rubber and the devulcanizing agent are heated and mixed is preferably controlled to be 100° C. or lower. When the heating temperature is set to be as low as 100° C. or lower to effectively apply a shearing force to the vulcanized rubber and devulcanizing agent, a devulcanized rubber and a rubber composition exhibiting good post-vulcanization physical properties can be produced. The heating temperature is more preferably set to 50° C. or lower.

In the obtained devulcanized rubber, the sulfur cross-linked portion of the vulcanized rubber reused is selectively cleaved, and therefore good post-vulcanization physical properties can be obtained even when the devulcanized rubber is mixed with an unvulcanized (unused) rubber component before use. The rubber composition preferably contains 1 to 30 parts by mass of the devulcanized rubber per 100 parts by mass of the total amount of the unvulcanized rubber component in the rubber composition. As the rubber component, sulfur, a vulcanization accelerator, carbon black, silica, a silane coupling agent, zinc oxide, stearic acid, a vulcanization retardant, an organic peroxide, an antiaging agent, a softener such as wax or oil, a processing aid, and the like which can constitute the rubber composition containing the devulcanized rubber, the same as described above can be used.

A method for blending the devulcanized rubber and the above components is not particularly limited, and any one of the following methods may be used: a method in which components to be blended other than vulcanization-type components such as sulfur and a vulcanization accelerator are previously kneaded to prepare a master batch, the remaining component(s) is(are) added to the master batch, and the mixture is further kneaded, a method in which components are added in any order and kneaded, and a method in which all the components are added at the same time and kneaded.

The rubber composition containing the devulcanized rubber has excellent processability and post-vulcanization physical properties. Therefore, the devulcanized rubber and the rubber composition containing the devulcanized rubber according to the present invention can particularly suitably be used for a pneumatic tire including a large amount of rubber part.

EXAMPLES

Hereinbelow, the present invention will more specifically be described with reference to examples.
(Preparation of Vulcanized Rubbers Used as Raw Materials of Devulcanized Rubbers)

Compounding agents except for sulfur and a vulcanization accelerator were added to and kneaded with 100 parts by mass of a rubber component according to a formulation shown in Table 1 in a first mixing stage using a lab mixer manufactured by DAIHAN CO., LTD. Then, sulfur and a vulcanization accelerator were added to and kneaded with the obtained kneaded product in a second mixing stage to prepare a rubber composition.

TABLE 1

| Formulation (parts by mass) | Vulcanized rubber (NR type) | Vulcanized rubber (mixed type) |
|---|---|---|
| Natural rubber | 100 | 20 |
| Styrene-butadiene rubber | | 60 |
| Butadiene rubber | | 20 |
| Carbon black | 50 | 5 |
| Silica | | 45 |
| Zinc white | 2 | 2 |
| Antiaging agent | 0.5 | 0.5 |
| Stearic acid | 2 | 2 |
| Sulfur | 2.5 | 2.5 |
| Vulcanization accelerator 1 | 1 | 1 |
| Vulcanization accelerator 2 | | 1 |

The details of the components listed in Table 1 are as follows.

Natural rubber: STR 20
Styrene-butadiene rubber: "Tufdene 2000" manufactured by Asahi Kasei Corp.
Butadiene rubber: "NF35" manufactured by Asahi Kasei Corp.
Carbon black: "SEAST 3" manufactured by Tokai Carbon Co., Ltd.
Silica: "Nipsil AQ" manufactured by Oriental Silicas Corporation
Zinc White: "Zinc White #1" manufactured by Mitsui Mining & Smelting Corporation
Antiaging agent: "NOCRAC 6C" manufactured by Ouchi Shinko Chemical Industrial Co., Ltd.
Stearic acid: "LUNAC S-20" manufactured by Kao Corporation
Sulfur: "Powdered sulfur for rubber, 150 mesh" manufactured by Hosoi Chemical Industry Co., Ltd.
Vulcanization accelerator 1: "NOCCELER NS" manufactured by Ouchi Shinko Chemical Industrial Co., Ltd.
Vulcanization accelerator 2: "NOCCELER D" manufactured by Ouchi Shinko Chemical Industrial Co., Ltd.

The rubber composition was vulcanized at 150° C. for 25 minutes to produce a sheet-shaped vulcanized rubber, and the vulcanized rubber was pulverized using a roll (6-inch roll manufactured by KANSAI ROLL Co., Ltd.). In this way, a powdery vulcanized rubber (NR type) and a powdery vulcanized rubber (mixed type) were prepared.

(Production of Devulcanized Rubbers)

The powdery vulcanized rubber (NR type) or the powdery vulcanized rubber (mixed type) and a devulcanizing agent were mixed at a ratio shown in Table 2, and the mixture of the vulcanized rubber powder and the devulcanizing agent was then repeatedly passed through a roll (6-inch roll manufactured by KANSAI ROLL Co., Ltd.) whose surface was coded to 25° C. at minimum intervals for 40 minutes while the mixture was cooled. In this way, devulcanized rubbers according to Example 1 to 8 and Comparative Examples 1 to 6 were produced (heating temperature during mixing: 25° C.).

TABLE 2

| Formulation (parts by mass) | Comparative Example 1 | Comparative Example 2 | Example 1 | Example 2 | Example 3 | Example 4 | Example 5 | Example 6 |
|---|---|---|---|---|---|---|---|---|
| Vulcanized rubber (NR type) | 100 | 100 | 100 | 100 | 100 | 100 | 100 | 100 |
| Vulcanized rubber (mixed type) | | | | | | | | |
| Devulcanizing agent 1 | 5 | 10 | | | | | | |
| Devulcanizing agent 2 | | | 1 | 5 | 10 | 20 | | |
| Devulcanizing agent 3 | | | | | | | 1 | 5 |
| Devulcanizing agent 4 | | | | | | | | |
| Devulcanizing agent 5 | | | | | | | | |
| Devulcanizing agent 6 | | | | | | | | |

| Formulation (parts by mass) | Example 7 | Comparative Example 3 | Comparative Example 4 | Comparative Example 5 | Comparative Example 6 | Example 8 |
|---|---|---|---|---|---|---|
| Vulcanized rubber (NR type) | 100 | 100 | 100 | 100 | | |
| Vulcanized rubber (mixed type) | | | | | 100 | 100 |
| Devulcanizing agent 1 | | | | | | |
| Devulcanizing agent 2 | | | | | | |
| Devulcanizing agent 3 | 10 | | | | | |
| Devulcanizing agent 4 | | 5 | 10 | | | |
| Devulcanizing agent 5 | | | | 5 | 5 | |
| Devulcanizing agent 6 | | | | | | 5 |

The details of the devulcanizing agents listed in Table 2 are as follows.

Devulcanizing agent 1: "stearyiamine" (carbon number=18) manufactured by Tokyo Chemical Industry Co., Ltd.

Devulcanizing agent 2 "Nosylated product of hexadecylamine" (Devulcanizing agent having an alkylsulfonamide group, carbon number=20)

Devulcanizing agent 3 "Tosylated product of stearyiamine" (Devulcanizing agent having an alkylsulfonamide group, carbon number=25)

Devulcanizing agent 4: "Hexaclecylamine" (carbon number=16) manufactured by Tokyo Chemical Industry Co., Ltd.

Devulcanizing agent 5: "Dodecyiamine" (carbon number=12) manufactured by Tokyo Chemical Industry Co., Ltd.

Devulcanizing agent 6 "Nosylated product of dodecyiamine" (Devulcanizing agent having an alkylsulfonamide group, carbon number=16)

It is to be noted that the devulcanizing agent 2, the devulcanizing agent 3, and the devulcanizing agent 6 were produced by the following methods.

(Devulcanizing Agent 3)

27 g of stearylamine and 8 g of pyridine manufactured by Tokyo Chemical Industry Co., Ltd. were dissolved in 200 mL of dichloromethane manufactured by NACALAI TESQUE, INC. Into this solution, a solution obtained by dissolving 19 g of p-toluenesulfonic acid chloride manufactured by Tokyo Chemical Industry Co., Ltd. in 100 mL of dichloromethane was dropped at room temperature while the mixture was stirred, and the mixture was continuously stirred overnight. After the completion of stirring, a filtrate obtained by filtering out a precipitate was washed with 100 mL of a 10% aqueous citric acid solution (citric acid was a product manufactured by NACALAI TESQUE, INC.) three times, and then an appropriate amount of anhydrous magnesium sulfate manufactured by NACALAI TEASQUE, INC. was added for dehydration. The anhydrous magnesium sulfate was filtered out, and then the solution was concentrated under reduced pressure to obtain a slurry. The slurry was filtered, and a solid was washed with hexane (manufactured by NACALAI TESQUE, INC.) and then vacuum-dried to obtain a devulcanizing agent 3 represented by the following formula (2).

[Formula 2]

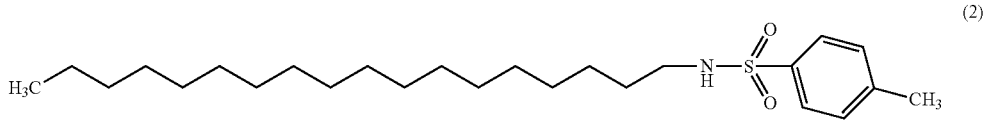

(2)

(Devulcanizing Agent 2)

9.64 g of hexadecylamine and 3.5 g of sodium hydrogen carbonate manufactured by NACALAI TESQUE, INC. were dissolved/suspended in 200 mL of dichloromethane manufactured by NACALAI TESQUE, INC. Into this solution, a solution obtained by dissolving 8.84 g of 2-nitrobenzenesulfonic acid chloride manufactured by Tokyo Chemical Industry Co., Ltd. in 100 mL of dichloromethane was dropped at room temperature while the mixture was stirred, and the mixture was continuously stirred overnight. After the completion of stirring, a filtrate obtained by filtering out a precipitate was washed with 100 mL of a 10% aqueous citric acid solution (citric acid was a product manufactured by NACALAI TESQUE, INC.) three times, and then an appropriate amount of anhydrous magnesium sulfate manufactured by NACALAI TEASQUE, INC. was added for dehydration. The anhydrous magnesium sulfate was filtered out, and then the solution was concentrated under reduced pressure to obtain a slurry. The slurry was filtered, and a solid was washed with hexane (manufactured by NACALAI TESQUE, INC.) and then vacuum-dried to obtain a devulcanizing agent 2 represented by the following formula 1).

(Devulcanizing Agent 6)

5.6 g of hexadecylamine and 3.5 g of sodium hydrogen carbonate manufactured by NACALAI TESQUE, INC. were dissolved/suspended in 200 mL of ethyl acetate manufactured by NACALAI TESQUE, INC. Into this solution, a solution obtained by dissolving 6.6 g of 2-nitrobenzenesulfonic acid chloride manufactured by Tokyo Chemical Industry Co., Ltd. in 100 mL of ethyl acetate was dropped at room temperature while the mixture was stirred, and the mixture was continuously stirred overnight. After the completion of stirring, a filtrate obtained by filtering out a precipitate was washed with 100 mL of a 10% aqueous citric acid solution (citric acid was a product manufactured by NACALAI TESQUE, INC.) three times, and then an appropriate amount of anhydrous magnesium sulfate manufactured by NACALAI TEASQUE, INC. was added for dehydration. The anhydrous magnesium sulfate was filtered out, and then the solution was concentrated under reduced pressure to obtain a slurry. The slurry was filtered, and a solid was washed with hexane (manufactured by HACALAI TESQUE, INC.) and then vacuum-dried to obtain a devulcanizing agent 6 represented by the following formula (3).

[Formula 1]

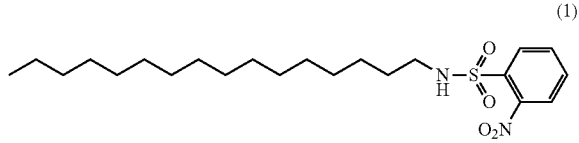

(1)

[Formula 3]

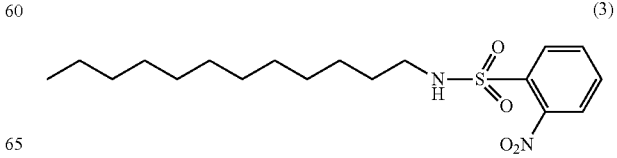

(3)

(Preparation of Rubber Compositions)

Components were blended with 100 parts by mass of a rubber component according to a formulation shown in Table 3 and kneaded using a lab mixer manufactured by DAIHAN CO., LTD. In this way, rubber compositions respectively containing the devulcanized rubbers produced in Examples 1 to 8 and Comparative Examples 1 to 6 were prepared.

The details of the components listed in Table 3 are as follows.

Natural rubber: STR 20
Carbon black: "SEAST 3" manufactured by Tokai Carbon Co., Ltd.
Zinc White: "Zinc White #1" manufactured by Mitsui Mining & Smelting Corporation
Antiaging agent: "NOCRAC 6C" manufactured by Ouchi Shinko Chemical Industrial Co., Ltd.
Stearic acid: "LUNAC S-20" manufactured by Kao Corporation
Sulfur: "Powdered sulfur for rubber, 150 mesh" manufactured by Hosoi chemical industry Co., Ltd.
Vulcanization accelerator: "NOCCELER NS" manufactured by Ouchi Shinko Chemical Industrial Co., Ltd.

(Evaluation of Processability of Rubber Compositions Containing Devulcanized Rubbers and Post-Vulcanization Physical Properties of Vulcanized Rubbers (300% Extensional Stress))

The processability of the rubber compositions respectively containing the devulcanized rubbers produced in Examples 1 to 8 and Comparative Examples 1 to 6 was evaluated by measuring the scorch times of the rubber compositions by the following method.

Scorch time: The scorch time (t5) of the rubber composition was measured by a Mooney viscometer in accordance with JIS K6300-1. The evaluation was made on the basis of index numbers relative to the scorch time of Comparative Example 1 defined as 100, and the larger index number means a longer scorch time, that is, higher processability.

Then, the obtained rubber compositions were vulcanized at 150° C. for 25 minutes to produce test pieces having a predetermined shape, and the following test was performed using the obtained test pieces.

300% extensional stress: The 300% extensional stress of the rubber composition was measured by a tensile test (JIS No. 3 dumbbell) in accordance with JIS K6251. The evaluation was made on the basis of index numbers relative to the 300% extensional stress of Comparative Example 1 defined as 100, and the larger index number mean more excellent post-vulcanization physical properties.

TABLE 3

| Formulation (parts by mass) | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 |
|---|---|---|---|---|---|---|---|
| Natural rubber | 100 | 100 | 100 | 100 | 100 | 100 | 100 |
| Carbon black | 50 | 50 | 50 | 50 | 50 | 50 | 50 |
| Zinc white | 2 | 2 | 2 | 2 | 2 | 2 | 2 |
| Antiaging agent | 0.5 | 0.5 | 0.5 | 0.5 | 0.5 | 0.5 | 0.5 |
| Stearic acid | 2 | 2 | 2 | 2 | 2 | 2 | 2 |
| Sulfur | 1.5 | 2.5 | 2.5 | 2.5 | 2.5 | 2.5 | 2.5 |
| Vulcanization accelerator | 1.5 | 1 | 1 | 1 | 1 | 1 | 1 |
| Devulcanized rubber (Comparative Example 1) | 10 | | | | | | |
| Devulcanized rubber (Comparative Example 2) | | 10 | | | | | |
| Devulcanized rubber (Example 1) | | | 10 | | | | |
| Devulcanized rubber (Example 2) | | | | 10 | | | |
| Devulcanized rubber (Example 3) | | | | | 10 | | |
| Devulcanized rubber (Example 4) | | | | | | 10 | |
| Devulcanized rubber (Example 5) | | | | | | | 10 |
| Devulcanized rubber (Example 6) | | | | | | | |
| Devulcanized rubber (Example 7) | | | | | | | |
| Devulcanized rubber (Comparative Example 3) | | | | | | | |
| Devulcanized rubber (Comparative Example 4) | | | | | | | |
| Devulcanized rubber (Comparative Example 5) | | | | | | | |
| Devulcanized rubber (Comparative Example 6) | | | | | | | |
| Devulcanized rubber (Example 8) | | | | | | | |
| Scorch time | 100 | 70 | 192 | 180 | 192 | 185 | 184 |
| 300% extensional stress | 100 | 93 | 107 | 106 | 109 | 109 | 111 |

TABLE 3-continued

| Formulation (parts by mass) | Vulcanized rubber 8 | Vulcanized rubber 9 | Vulcanized rubber 10 | Vulcanized rubber 11 | Vulcanized rubber 12 | Vulcanized rubber 13 | Vulcanized rubber 14 |
|---|---|---|---|---|---|---|---|
| Natural rubber | 100 | 100 | 100 | 100 | 100 | 100 | 100 |
| Carbon black | 50 | 50 | 50 | 50 | 50 | 50 | 50 |
| Zinc white | 2 | 2 | 2 | 2 | 2 | 2 | 2 |
| Antiaging agent | 0.5 | 0.5 | 0.5 | 0.5 | 0.5 | 0.5 | 0.5 |
| Stearic acid | 2 | 2 | 2 | 2 | 2 | 2 | 2 |
| Sulfur | 2.5 | 2.5 | 2.5 | 2.5 | 2.5 | 2.5 | 2.5 |
| Vulcanization accelerator | 1 | 1 | 1 | 1 | 1 | 1 | 1 |
| Devulcanized rubber (Comparative Example 1) | | | | | | | |
| Devulcanized rubber (Comparative Example 2) | | | | | | | |
| Devulcanized rubber (Example 1) | | | | | | | |
| Devulcanized rubber (Example 2) | | | | | | | |
| Devulcanized rubber (Example 3) | | | | | | | |
| Devulcanized rubber (Example 4) | | | | | | | |
| Devulcanized rubber (Example 5) | | | | | | | |
| Devulcanized rubber (Example 6) | 10 | | | | | | |
| Devulcanized rubber (Example 7) | | 10 | | | | | |
| Devulcanized rubber (Comparative Example 3) | | | 10 | | | | |
| Devulcanized rubber (Comparative Example 4) | | | | 10 | | | |
| Devulcanized rubber (Comparative Example 5) | | | | | 10 | | |
| Devulcanized rubber (Comparative Example 6) | | | | | | 10 | |
| Devulcanized rubber (Example 8) | | | | | | | 10 |
| Scorch time | 188 | 183 | 247 | 138 | 161 | 184 | 263 |
| 300% extensional stress | 111 | 110 | 110 | 98 | 99 | 102 | 105 |

As can be seen from the results shown in Table 3, the rubber compositions respectively containing the devulcanized rubbers produced in Examples 1 to 3 are superior in processability to the rubber compositions respectively containing the devulcanized rubbers produced in Comparative Examples 1 to 6. In addition, it can be seen that the vulcanized rubbers (vulcanized rubbers 3 to 9 and 14) of the rubber compositions respectively containing the devulcanized rubbers produced in Examples 1 to 8 are superior in post-vulcanization physical properties to the vulcanized rubbers (vulcanized rubbers 1 to 2 and 10 to 13) of the rubber compositions respectively containing the devulcanized rubbers produced in Comparative Examples 1 to 6.

What is claimed is:

1. A devulcanized rubber obtained by mixing a devulcanizing agent having an alkylsulfonamide group and a vulcanized rubber, wherein the devulcanizing agent contains a sulfonamide compound of an alkylamine having 12 or more carbon atoms.

2. A rubber composition comprising the devulcanized rubber according to claim 1.

3. The rubber composition according to claim 2, wherein the rubber composition contains 1 to 30 parts by mass of the devulcanized rubber per 100 parts by mass of a total amount of an unvulcanized rubber component in the rubber composition.

4. A pneumatic tire comprising a rubber part obtained by vulcanizing and molding the rubber composition according to claim 3.

5. A pneumatic tire comprising a rubber part obtained by vulcanizing and molding the rubber composition according to claim 3.

* * * * *